(12) United States Patent
Schimpf et al.

(10) Patent No.: US 9,904,578 B2
(45) Date of Patent: *Feb. 27, 2018

(54) RESOURCE ALLOCATION FOR SOFTWARE DEVELOPMENT

(75) Inventors: Brian C. Schimpf, Harvard, MA (US); Arthur Francis Crotty, North Reading, MA (US); Shailaja Sthalekar Golikeri, Acton, MA (US); Yuhong Yin, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 430 days.

This patent is subject to a terminal disclaimer.

(21) Appl. No.: 12/955,303

(22) Filed: Nov. 29, 2010

(65) Prior Publication Data

US 2012/0137286 A1 May 31, 2012

(51) Int. Cl.
G06F 9/46 (2006.01)
G06F 9/50 (2006.01)
G06F 9/44 (2018.01)
G06Q 10/06 (2012.01)

(52) U.S. Cl.
CPC .................. *G06F 9/50* (2013.01); *G06F 8/20* (2013.01); *G06Q 10/06313* (2013.01)

(58) Field of Classification Search
CPC .......................................... G06F 9/50–9/5094
See application file for complete search history.

(56) References Cited

U.S. PATENT DOCUMENTS

| 2003/0074217 | A1  | 4/2003  | Beisiegel et al. |
| 2005/0066326 | A1* | 3/2005  | Herbeck et al. ............. 718/100 |
| 2007/0240161 | A1* | 10/2007 | Prabhakar et al. .......... 718/104 |
| 2007/0283282 | A1* | 12/2007 | Bonfiglio et al. ............ 715/762 |
| 2008/0172673 | A1* | 7/2008  | Naik ...................... G06F 9/505 718/104 |
| 2009/0063213 | A1  | 3/2009  | Benayon et al. |
| 2009/0125873 | A1  | 5/2009  | Simon et al. |
| 2009/0199193 | A1* | 8/2009  | Jackson ....................... 718/104 |
| 2009/0282388 | A1  | 11/2009 | Gawor et al. |
| 2012/0102498 | A1* | 4/2012  | Subramanya ............ G06F 9/50 718/104 |

OTHER PUBLICATIONS

Software Development In the Cloud Cloud management and ALM Nick Gulrajani and Darryl Bowler Published: Feb. 2009.*
The NMI Build & Test Laboratory: Continuous Integration Framework for Distributed Computing Software Andrew Pavlo, Peter Couvares, Rebekah Gietzel, Anatoly Karp, Ian D. Alderman, and Miron Livny Published: 2006.*

(Continued)

*Primary Examiner* — Emerson Puente
*Assistant Examiner* — Paul Mills
(74) *Attorney, Agent, or Firm* — Brian J. Colandreo, Esq.; Jeffrey T. Placker, Esq.; Holland & Knight LLP

(57) ABSTRACT

Software development data indicative of a development activity is accessed. A component parameter of a component of a software development platform is set, in which the component parameter is based upon, at least in part, an anticipated component workload associated with the development activity. At least one system resource is allocated for the component of the software development platform based upon, at least in part, the component parameter.

16 Claims, 2 Drawing Sheets

(56) References Cited

OTHER PUBLICATIONS

A Profile-based Approach to Just-in-time Scalability for Cloud Applications Yang Jie, Qiu Jie, Li Ying Published: 2009.*
Simmons, et al., "Sofware Engineering Expert System for Global Development", Proceedings of the 18th IEEE International Conference on Tools with Artificial Intelligence (ICTAI'06), 2006 pp. 1-6.
Sukeshini, Kalaiselvan K, et al., "Integrated Development Environment for GARUDA Grid (G-IDE)", Third IEEE International Conference on e-Science and Grid Computing, 2007 pp. 499-506.
Kurniawan, et al., "An IDE Framework for Grid Application Development", 9th Grid Computing Conference IEEE, 2008 pp. 184-191.
http://en.wikipedia.org/wiki/Autonomic_Systems, pp. 1-8, Nov. 19, 2012.

* cited by examiner

RESOURCE ALLOCATION FOR SOFTWARE DEVELOPMENT

BACKGROUND OF THE INVENTION

This disclosure relates to resource allocation in a software development environment.

Integrated software development platforms are in increasingly wide use in the software development industry. These often include development services such as software configuration management systems, activity tracking systems, project management and tracking capabilities and so forth. These platforms are typically distributed over multiple systems and provide comprehensive capabilities to make software development teams as efficient and effective as possible.

Such integrated software development platforms are often complex systems that typically include a variety of component configuration parameters that can be adjusted by system administrators to tune the system for optimal performance and reliability, e.g., network-related parameters for distributed systems, capacity parameters for back-end server systems, etc. System administrators typically learn how to tune these parameters based on their own experience with the products and the particular teams they are supporting. This level of tuning usually takes place over some extended period of time and is therefore slow and inefficient, in addition to being dependent on the skill of the administrator involved.

BRIEF SUMMARY OF THE INVENTION

In a first implementation, a method includes accessing, by a computing device, software development data indicative of a development activity. A component parameter of a component of a software development platform is set. The component parameter is based upon, at least in part, an anticipated component workload associated with the development activity. At least one system resource is allocated for the component of the software development platform based upon, at least in part, the component parameter.

One or more of the following features may be included. The software development data may include a software development schedule. The software development data may include a software development platform transaction. Setting the component parameter may include setting an application server profile.

The at least one system resource may include one or more of a number of CPU's, a number of CPU cores, memory, and disk space. The component of the software development platform may include a virtual machine. At least one system resource may be allocated for a second component of the software development platform based upon, at least in part, allocating the at least one system resource for the component of the software development platform.

According to another implementation, a computer program product includes a computer readable medium having a plurality of instructions stored on it. When executed by a processor, the instructions cause the processor to perform operations including accessing software development data indicative of a development activity. A component parameter of a component of a software development platform is set. The component parameter is based upon, at least in part, an anticipated component workload associated with the development activity. At least one system resource is allocated for the component of the software development platform based upon, at least in part, the component parameter.

One or more of the following features may be included. The software development data may include a software development schedule. The software development data may include a software development platform transaction. The instructions for setting the component parameter may include instructions for setting an application server profile.

The at least one system resource may include one or more of a number of CPU's, a number of CPU cores, memory, and disk space. The component of the software development platform may include a virtual machine. Instructions may be included for allocating at least one system resource for a second component of the software development platform based upon, at least in part, allocating the at least one system resource for the component of the software development platform.

According to yet another implementation, a system includes a processor and a memory. A first software module is executable by the processor and the memory. The first software module is configured to access software development data indicative of a development activity. A second software module is executable by the processor and the memory. The second software module is configured to set a component parameter of a component of a software development platform. The component parameter based upon, at least in part, an anticipated component workload associated with the development activity. A third software module is also executable by the processor and the memory. The third software module is configured to allocate at least one system resource for the component of the software development platform based upon, at least in part, the component parameter.

One or more of the following features may be included. The software development data may include a software development schedule. The software development data may include a software development platform transaction. The second software module, configured to set the component parameter, may be further configured to set an application server profile.

The at least one system resource may include one or more of a number of CPU's, a number of CPU cores, memory, and disk space. The component of the software development platform may include a virtual machine. A fourth software module may be executable by the processor and the memory. The fourth software module may be configured to allocate at least one system resource for a second component of the software development platform based upon, at least in part, allocating the at least one system resource for the component of the software development platform.

The details of one or more implementations are set forth in the accompanying drawings and the description below. Other features will become apparent from the description, the drawings, and the claims.

DETAILED DESCRIPTION OF THE INVENTION

Figure 1:
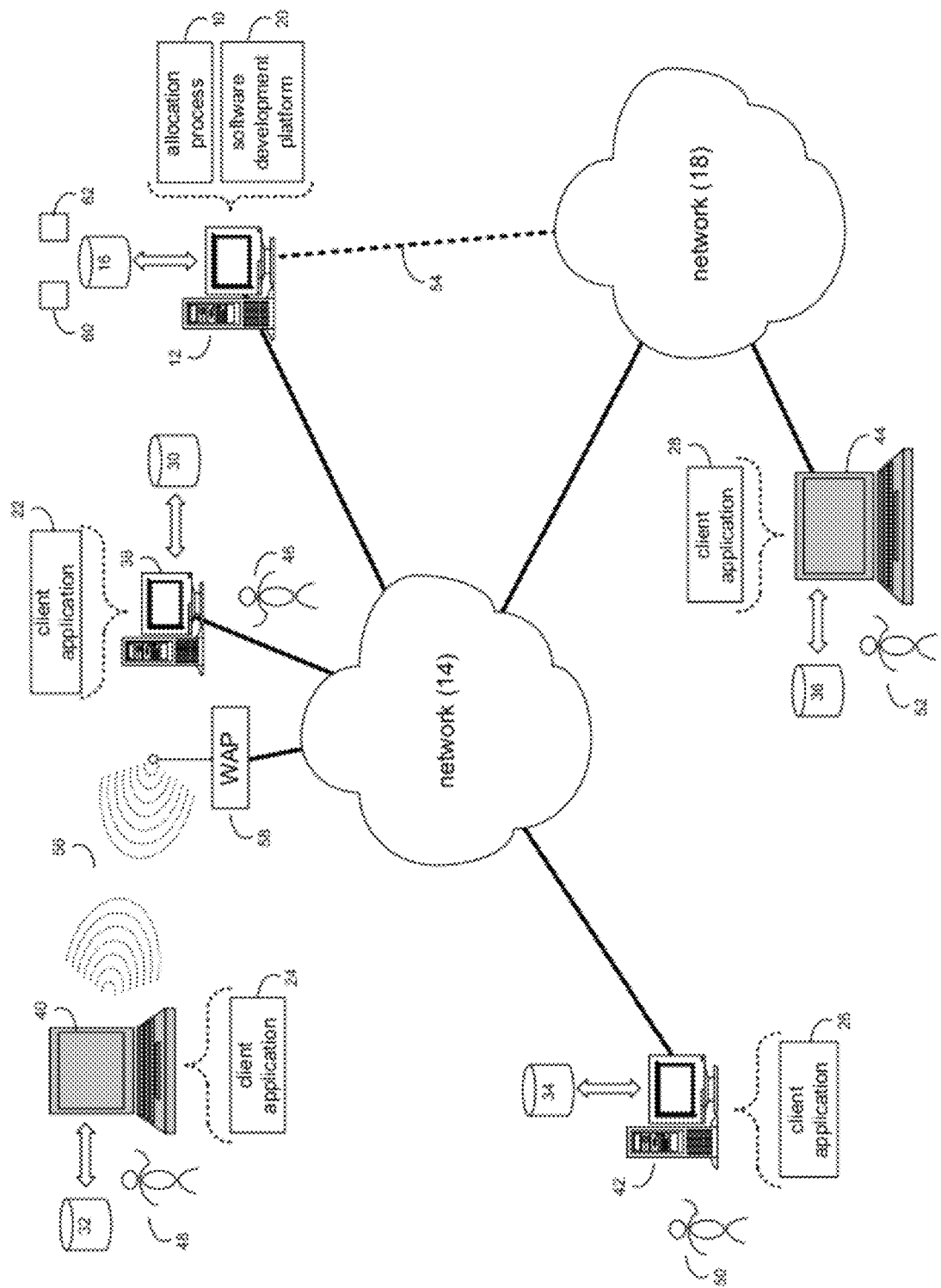
FIG. 1 diagrammatically depicts an allocation process coupled to an software development platform.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown allocation process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

As will be discussed below in greater detail, allocation process 10 may access software development data indicative of a development activity. Allocation process 10 may further set a component parameter of a component of a software development platform. The component parameter may be based upon, at least in part, an anticipated component workload associated with the development activity. At least one system resource may be allocated for the component of the software development platform based upon, at least in part, the component parameter.

The instruction sets and subroutines of allocation process 10, which may be configured as one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive; a tape drive; an optical drive; a RAID array; a random access memory (RAM); and a read-only memory (ROM).

Server computer 12 may be network accessible via network 14, examples of which may include, but are not limited to, a local area network, a wide area network, an intranet, the Internet, etc. Network 14 may be connected to one or more secondary networks (e.g., network 18), examples of which may include but are not limited to: a local area network; a wide area network; or an intranet, for example.

Server computer 12 may execute software development platform 20, an example of software development platform 20 may include, but is not limited to, Rational Team Concert™ by IBM. (Rational Team Concert is a trademark of IBM Corporation in the United States, other countries, or both). Software development platform 20 may provide various software development tools including, but not limited to, planning tools, source code editing and management tools (e.g., software configuration management tools), and automated testing tools. Examples of such tools may include Rational® Quality Manager, Rational® Requirements Composer, Rational Project Conductor™, (all by IBM), etc., which may include components of the software development platform and/or may be stand-alone applications which may, in some embodiments, interact with the software development platform. (Rational is a registered trademark of IBM Corporation in the United States, other countries, or both; Rational Project Conductor is a trademark of IBM Corporation in the United States, other countries, or both). Software development platform 20 may be accessed by one or more client applications (e.g., client applications 22, 24, 26, 28, examples of which may include but are not limited to web browsers (e.g., Microsoft Internet Explorer®, Apple® Safari®, etc.) or a custom interface application. (Internet Explorer is a registered trademark of Microsoft Corporation in the United States, other countries, or both, and Apple and Safari are registered trademarks of Apple Inc. in the United States, other countries, or both).

The instruction sets and subroutines of software development platform 20 (and of any tools and/or modules incorporated into software development platform 20, and/or interacting with software development platform 20), which may be configured as one or more software modules, and which may be stored on storage device 16 coupled to server computer 12 may be executed by one or more processors (not shown) and one or more memory modules (not shown) incorporated into server computer 12. Additionally, software development platform 20 (and any tools and/or modules incorporated into software development platform 20, and/or interacting with software development platform 20) may be distributed over multiple systems and/or server computers.

The instruction sets and subroutines of client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computers 38, 42, laptop computer 40, 44, for example. Of course various other client electronic devices may equally be utilized. Using client applications 22, 24, 26, 28, users 46, 48, 50, 52 may, for example, perform various software development activities, including development planning, collaboration with other users, code editing, software testing, etc.

Users 46, 48, 50, 52 may access software development platform 20 directly through the device on which the client application (e.g., client applications 22, 24, 26, 28) is executed, namely client electronic devices 38, 40, 42, 44, for example. Users 46, 48, 50, 52 may access software development platform 20 directly through network 14 or through secondary network 18. Further, server computer 12 (i.e., the computer that executes software development platform 20 and/or allocation process 10) may be connected to network 14 through secondary network 18, as illustrated with phantom link line 54.

The various client electronic devices may be directly or indirectly coupled to network 14 (or network 18). For example, personal computers 38, 42 are shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft® Windows®, Microsoft Windows CE®, Red Hat® Linux®, or a custom operating system (Windows CE is a registered trademark of Microsoft Corporation in the United States, other countries, or both).

Figure 2:
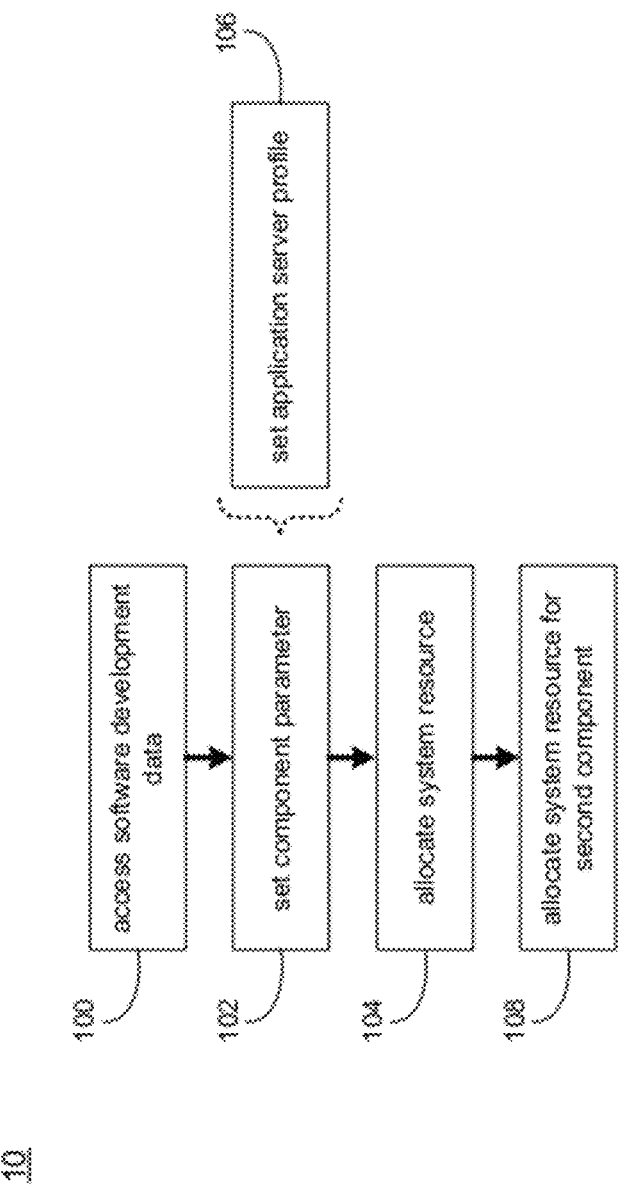
FIG. 2 is a flowchart of a process executed by the allocation process of FIG. 1.

Referring also to FIG. 2, allocation process 10 may access 100 software development data indicative of a development activity. A component parameter of a component of a software development platform may be set 102. The component parameter may be based upon, at least in part, an anticipated component workload associated with the development activity. Allocation process 10 may also allocate 104 at least one system resource for the component of the software development platform based upon, at least in part, the component parameter. As such, in an embodiment, allocation process 10 may allocate 104 at least one system resource for a component of a software development platform for an anticipated component workload.

As discussed above, server computer 12 may execute a software development platform (e.g., software development platform 20). Software development platform 20 may provide access to various development tools (e.g., various components of the software development platform), either as modules of software development platform 20 or as stand-alone applications which can be accessed through, managed by, and/or utilized in conjunction with software development platform. Further, as described above, the various components of software development platform 20 may be executed on a single server computer (e.g., server computer 12). Additionally/alternatively, the various components may be distributed over multiple server computers or multiple computing systems.

Generally, software development may include phases, such as a planning phase, a coding/development phase, and a testing phase. Of course various additional/alternative phases may be included, which may vary depending upon the project. For example, during the planning there may be a relatively high degree of interaction between the various users making up the development team as each user gains an understanding of the specific development tasks that he has been assigned. During this planning phase, collaboration components (such as Rational Team Concert WorkItem by IBM Corporation) of the software development platform may be highly utilized. Similarly, during the coding/development phase, various users of the software development team may utilize software configuration management components of the software development platform, e.g., as they perform check-outs and deliveries of changed source code. Further, during the testing phase automated testing components of the software development platform may be highly utilized for testing the developed code. The phases, activities, and software development platform components described above should be understood as illustrative, and not a limitation on the present disclosure, as the phases, activities, and components may vary depending upon nature of the software development project, design criteria, and user need.

While generally, software development may include various phases, the phases, and the activities within the phases may overlap. Utilizing software development platform 20 various users working on a software development project may, for example, be able to view and edit source code, review defect repots, check-in edited source code, initiate builds, and run automated tests from the same environment, and even in common time frames. As such, some, or all, of the various components of software development platform 20 may all be utilized throughout the software development project. However, the workloads experienced by the various components may vary throughout the project with different components experiencing different workloads during different phases and/or different activities of the software development project.

As mentioned, allocation process 10 may access 100 software development data indicative of a development activity. As also noted above, software development may include many development activities. While the various activities (and components of software development platform 20 utilized in carrying out the various activities) may be performed to some degree throughout the software development project, specific activities may be generally grouped (e.g., in terms of greatest occurrence and/or experienced component workload) according to the various phases of the software development project.

The software development data accessed 100 by allocation process 10 may include a software development schedule. Such a software development schedule (e.g., software development schedule 60, which may reside as a document, timeline, workflow table, etc., that may be stored on a storage device, such as storage device 16 coupled to server computer 12) may explicitly state timelines and/or checkpoints associated with different phases of the software development project. Allocation process 10 may access 100 software development schedule 60, including data indicative of various development activities that may occur at different general times. For example, software development schedule 60 may indicate that system testing of the software being developed is to occur during the general time frame of November 20 through November 22.

While software development schedule 60 may include at least a general timeline of the software development project and the activities that may occur at various general times, the timing of the phases and activities may change throughout the course of the software development project. In some instances, software development schedule 60 may be regularly updated to reflect such changes. In such a situation, accessing 100 software development schedule 60 may continue to provide software development data indicative of a development activity occurring at a given general time. For example, the software development project may experience delays during coding/development. Software development schedule 60 may be updated to indicate that system testing of the software being developed may occur in the general timeframe of November 21 through November 23.

In an embodiment, the software development data may include a software development platform transaction. Software development platform transactions may include instances of use of the various components of software development platform 20. For example, a software development platform transaction may include a functional test run on a piece of code. Similarly, another software development platform transaction may include a 500 user system test of the completed software product. Software development data indicative of a development activity may include such software development platform transactions. Allocation process 10 may access 100 transaction data (e.g., which may be reside in transaction log 62 stored on storage device 16 coupled to server computer 12). Phases of the software development project may be inferred based upon, at least in part, the relative frequency and nature of the various software development platform transactions accessed 100 via the transaction data.

Allocation process 10 may set a component parameter of a component of software development platform 20. The component parameter may be based upon, at least in part, an anticipated component workload associated with the development activity. For example, during a development activity included within the coding/development phase of the software development project some testing, such as functional testing of a piece of code, is likely to occur. However, such a development activity may be anticipated to place a relatively small workload on an automated testing component of software development platform 20. During a testing phase of the software development project, system verification testing may be carried out representing a relatively large number of users in several operating system environments. Such system verification testing may have large anticipated workload associated with the automated testing component.

A component parameter of the component of software development platform 20 may include, for example, various system resources that may allow for satisfactory performance of the component under the anticipated workload. Further, the component parameter may relate to a timeframe associated with the development activity, during which the various system resources are desired to accommodate the anticipated workload. Accordingly, the component parameter(s) may include system resource parameters and timing parameters.

Setting 102 the component parameter may include setting 106 an application server profile. A server profile may include one or more component parameters based upon, at least in part, an anticipated component workload associated with the development activity. For example, various server profiles may be provided for each component associated with different timeframes during the software development project based upon, at least in part, different anticipated workloads associated with the various components during the different timeframes. Continuing with the above-stated example in which individual users may run functional tests of pieces of code during the coding/development phase of the software development project, the anticipated workload associated with the testing component of software development platform during the coding/development phase may be relatively low. A server profile associated with the testing component during the coding/development phase may include one or more component parameters that may reflect the relatively low anticipated testing component workload. Similarly, a relatively high workload associated with the testing component may be anticipated during the testing phase of the software development project. A server profile associated with the testing component during the testing phase may include one or more component parameters that may reflect the relatively high anticipated workload. A server profile may be associated with each component for each phase of the software development project. Additionally/alternatively, a server profile may be associated with each phase of the software development project. In such an embodiment, each server profile may include parameter settings for each component. The parameter setting for each component may be based upon, at least in part, an anticipated workload associated with each component for the software development phase of the server profile. Various additional/alternative server profiles may similarly be implemented.

Allocation process 10 may allocate 104 at least one system resource for the component of the software development platform based upon, at least in part, the component parameter. As noted above, the component parameter may include system resource parameters, e.g., which may include system parameter type as well as a quantity of the system resource. Additionally, the component parameter may include a timing component that may be based upon, at least in part, an anticipated component workload associated with the component at least a general given time. As such, allocation process 10 may allocate 104 one or more system resources at a specified time to allow for satisfactory performance of the component under the anticipated workload at the anticipated time.

Again referring to the above-mentioned example in which individual users may run some functional testing on pieces of code during the coding/development phase of the software development project (i.e., producing a relatively low anticipated component workload associated with a testing component of software development platform 20), while large scale system verification testing may take place during a testing phase of the software development project (i.e., producing a relatively high anticipated component workload associated with the testing component of software development platform 20). Allocation process 10 may allocate at least one system resource for the testing component to provide satisfactory performance under the low anticipated workload for the testing component during the coding/development phase. As the software development project moves into the testing phase (e.g., as may be indicated by the accessed 100 software development data), allocation process 10 may allocate 104 at least one system resource for the testing component to provide satisfactory performance under the high anticipated workload for the testing component during the testing phase of the software development project. The timing of allocating 104 the at least one system resource may be based upon, at least in part, the accessed 100 software development data and the set 102 component parameter, as discussed above.

The at least one system resource may include one or more of a number of CPU's, a number of CPU cores, memory, and disk space. Also, the component of the software development system may include a virtual machine. Accordingly, allocation process 10 may, for example, allocate 104 a given number of CPU's and a given number of CPU cores, as well as a given volume of memory and disk space (one or more of which may be based upon, at least in part the component parameter) to a component virtual machine.

Allocation process 10 may allocate 108 at least one system resource for a second component of the software development platform based upon, at least in part, allocating 104 the at least one system resource for the component of the software development platform. For example, as generally discussed above, the anticipated workload for various components of software development platform 20 may vary throughout the software development project. In such a manner, a relatively high anticipated workload associated with one component may generally be associated with a relatively low anticipated workload associated with a second component during the same general timeframe. For example, during the planning phase, a relatively high workload associated with a collaboration component may be anticipated. Allocation process 10 may allocate 104 at least one system resource to the collaboration component to allow satisfactory performance of the collaboration components under the anticipated relatively high workload. Similarly, during the planning phase a relatively low workload associated with a testing component may be anticipated. As such, allocation process 10 may allocate 108 at least one system resource for the testing component of the software development platform indicative of a relatively low anticipated testing component workload based upon the allocation 104 of resources based upon a relatively high anticipated workload for the collaboration components.

Allocation process 10 may, effectively, anticipate a workload associated with each component of software development platform 20 at any given time during the software development project. Allocation process 10 may, accordingly, allocate 104 one or more system resources to the various components of software development platform 20 to allow for satisfactory performance of the various components, given their anticipated associated workloads, at any given time during the software development project. Accordingly, the at least one system resource may be allocated 104 in advance of, at in time to satisfy, a given anticipated workload of a component of software development platform.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product comprising a non-transitory computer readable medium having a plurality of instructions stored thereon, which, when executed by a processor, cause the processor to perform operations for allocating one or more system resources amongst a plurality of components of a software development platform, wherein the components are utilized to perform software development activities to carry out a software development project and have corresponding component parameters which control the allocation of resources to the components, and wherein the software development project includes a plurality of phases, the operations comprising:

providing, by a computing device, a plurality of application server profiles, wherein each profile of the plurality of application server profiles corresponds to a respective one of the phases of the plurality of phases and includes parameter settings for the component parameters, wherein the parameter settings are based on an anticipated workload of the components in the corresponding phase;

accessing, by the computing device, software development data which includes at least timeframes for the plurality of phases of the software development project, wherein the software development data is updatable to reflect changes in the timeframes;

identifying, by the computing device, which of the plurality of phases the software development project is currently in based on the timeframes;

setting, by the computing device, the component parameters in accordance with the parameter settings in the application server profile which corresponds to the identified phase of the plurality of phases, wherein the identifying and setting are performed at least in response to detecting a change in the timeframes for the plurality of phases; and allocating dynamically, by the computing device, the one or more system resources to the components of the software development platform in accordance with the set component parameters.

2. The computer program product of claim 1, wherein the software development data includes a software development schedule which specifies the timeframes for the plurality of phases of the software development project.

3. The computer program product of claim 1, wherein the one or more system resources include one or more of a number of CPU's, a number of CPU cores, memory, and disk space.

4. The computer program product of claim 1, wherein one or more of the components of the software development platform include virtual machines.

5. The computer program product of claim 1, wherein the plurality of phases of the software development project include one or more of a planning phase, a coding phase, a testing phase.

6. The computer program product of claim 1, wherein the plurality of components include one or more of a collaboration component, a source code editing component, a software configuration management component, and an automated testing component.

7. The computer program product of claim 6, wherein the plurality of phases of the software development project include a planning phase and the parameter settings in the application server profile corresponding to the planning phase reflect a relatively high anticipated workload for the collaboration component and a relatively low anticipated workload for the automated testing component.

8. The computer program product of claim 1, wherein the components of the software development platform are accessed by one or more client devices via a network to perform one or more of the software development activities.

9. A system for allocating one or more system resources amongst a plurality of components of a software development platform, wherein the components are utilized to perform software development activities to carry out a software development project and have corresponding component parameters which control the allocation of resources to the components, and wherein the software development project includes a plurality of phases, the system comprising:

a processor; and a memory storing one or more executable software modules which, when executed by the processor, cause the system to perform operations comprising:

providing, by a computing device, a plurality of application server profiles, wherein each profile of the plurality of application server profiles corresponds to a respective one of the phases of the plurality of phases and includes parameter settings for the component parameters, wherein the parameter settings are based on an anticipated workload of the components in the corresponding phase;

accessing, by the computing device, software development data which includes at least timeframes for the plurality of phases of the software development project, wherein the software development data is updatable to reflect changes in the timeframes;

identifying, by the computing device, which of the plurality of phases the software development project is currently in based on the timeframes;

setting, by the computing device, the component parameters in accordance with the parameter settings in the application server profile which corresponds to the identified phase of the plurality of phases, wherein the identifying and setting are performed at least in response to detecting a change in the timeframes for the plurality of phases; and allocating dynamically, by the computing device, the one or more system resources to the components of the software development platform in accordance with the set component parameters.

10. The system of claim 9, wherein the software development data includes a software development schedule which specifies the timeframes for the plurality of phases of the software development project.

11. The system of claim 9, wherein the one or more system resources include one or more of a number of CPU's, a number of CPU cores, memory, and disk space.

12. The system of claim 9, wherein one or more of the components of the software development platform include virtual machines.

13. The system of claim 9, wherein the plurality of phases of the software development project include one or more of a planning phase, a coding phase, a testing phase.

14. The system of claim 9, wherein the plurality of components include one or more of a collaboration component, a source code editing component, a software configuration management component, and an automated testing component.

15. The system of claim 14, wherein the plurality of phases of the software development project include a planning phase and the parameter settings in the application server profile corresponding to the planning phase reflect a relatively high anticipated workload for the collaboration component and a relatively low anticipated workload for the automated testing component.

16. The system of claim 9, wherein the components of the software development platform are accessed by one or more client devices via a network to perform one or more of the software development activities.

* * * * *